United States Patent [19]
Van Tuyl

[11] 3,960,104
[45] June 1, 1976

[54] BACK-UP ALARM WITH IMPROVED KEEPER

[75] Inventor: David H. Van Tuyl, Palo Alto, Calif.

[73] Assignee: E. D. Bullard Company, Sausalito, Calif.

[22] Filed: May 9, 1975

[21] Appl. No.: 576,134

[52] U.S. Cl. ................................. 116/60; 116/56
[51] Int. Cl.² .......................................... B60Q 5/00
[58] Field of Search ............... 116/60, 56, 158, 159, 116/160, 164, 167, 67 R; 180/106

[56] References Cited
UNITED STATES PATENTS

| | | | |
|---|---|---|---|
| 2,802,441 | 8/1957 | Epstein | 116/56 |
| 2,807,229 | 9/1957 | Bookwalter | 116/56 |
| 2,915,036 | 12/1959 | Bookwalter | 116/56 |
| 3,065,726 | 11/1962 | Warn | 116/158 |
| 3,092,069 | 6/1963 | Baird | 116/60 |
| 3,492,967 | 2/1970 | Raschke | 116/60 |
| 3,793,982 | 2/1974 | Peterson | 116/60 |

*Primary Examiner*—S. Clement Swisher
*Assistant Examiner*—Denis E. Corr
*Attorney, Agent, or Firm*—Phillips, Moore, Weissenberger Lempio & Strabala

[57] ABSTRACT

A wheel hub mountable back up alarm is disclosed having a plurality of ringing units mounted interiorly of a bell. Each ringing unit has an improved clapper and an improved interacting keeper to prevent forward wheel motion ringing, to retard alarm freezing and sticking, and to provide minimum wear on non-ringing rotation.

21 Claims, 24 Drawing Figures

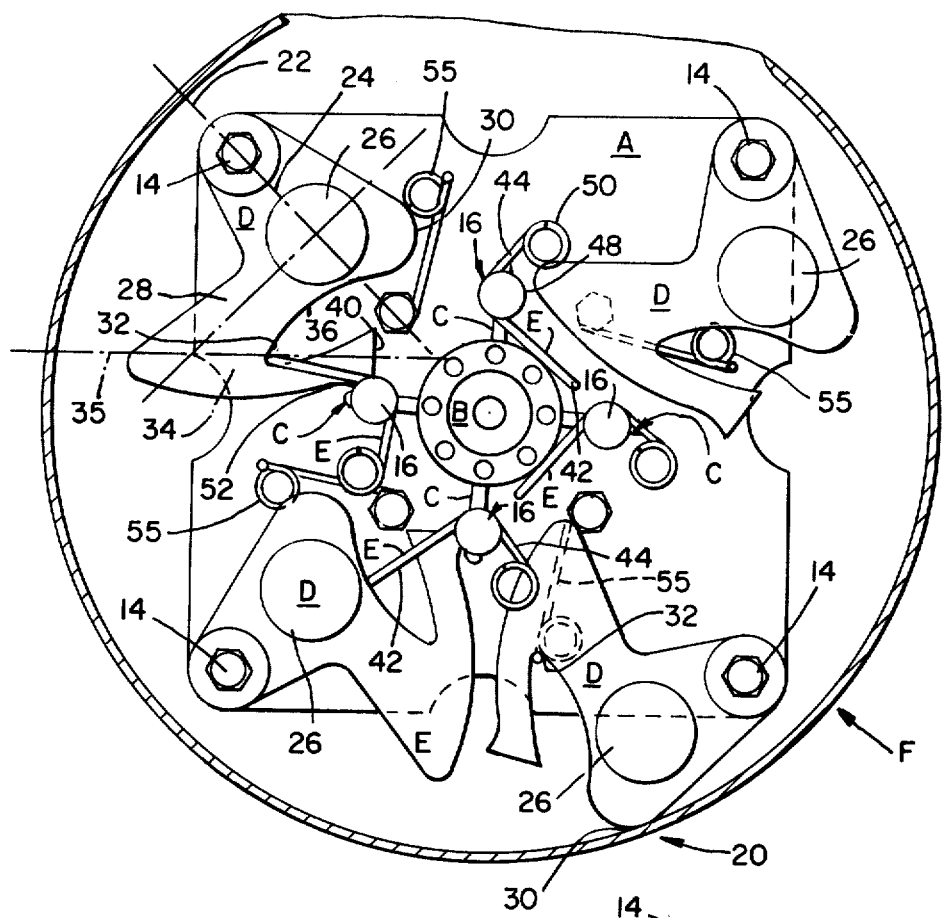
FIG_1
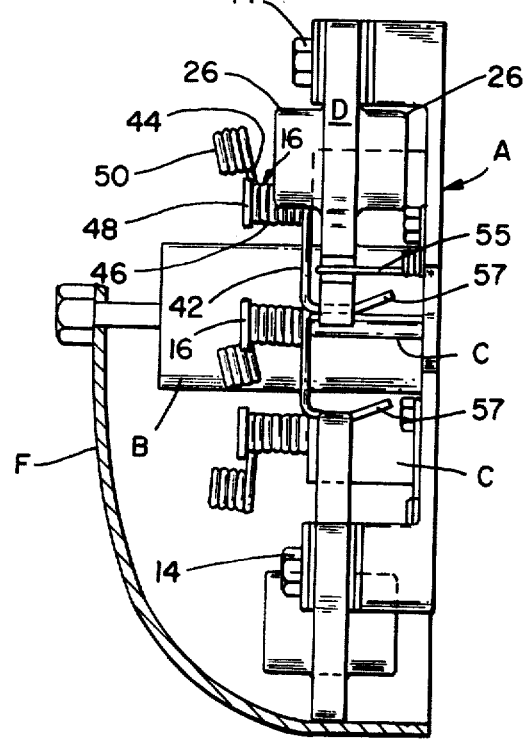
FIG_2

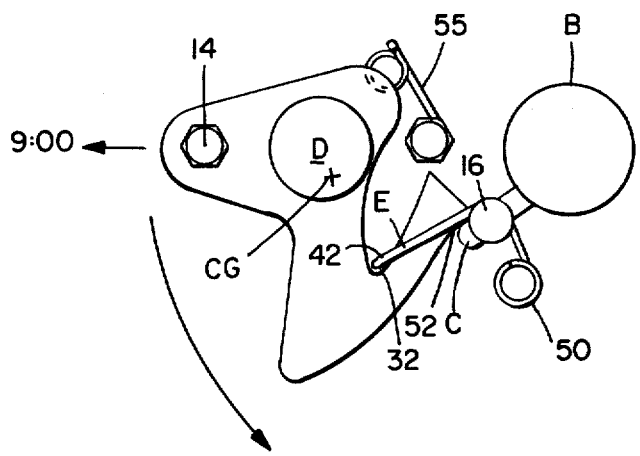
FIG_3a
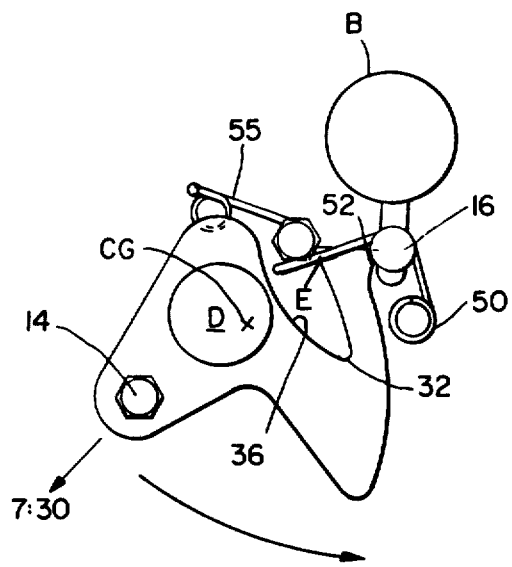
FIG_3b
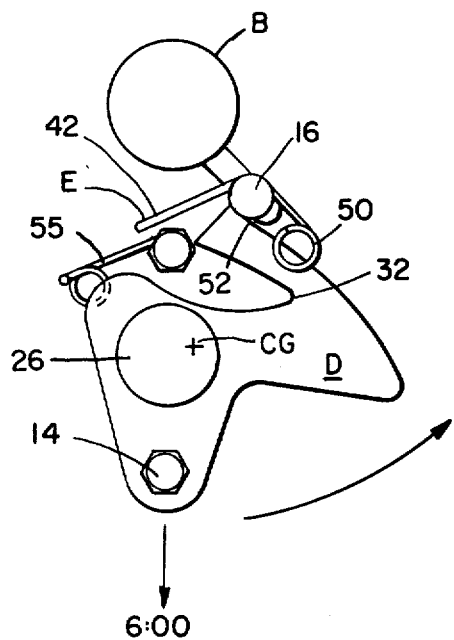
FIG_3c
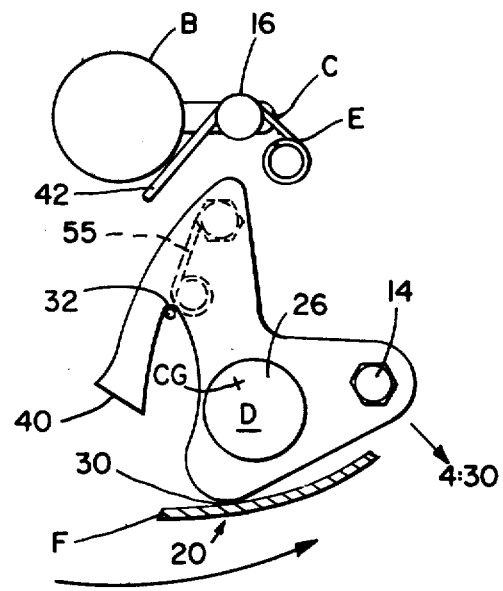
FIG_3d

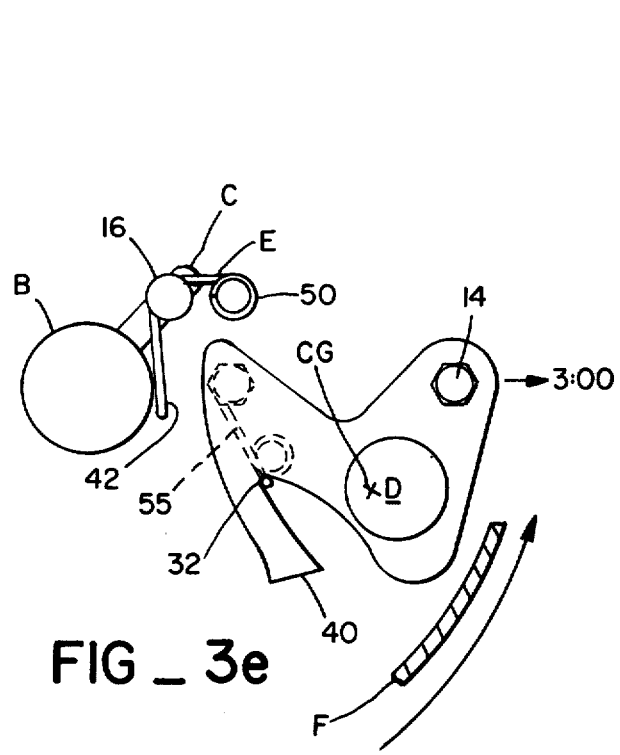
FIG_3e
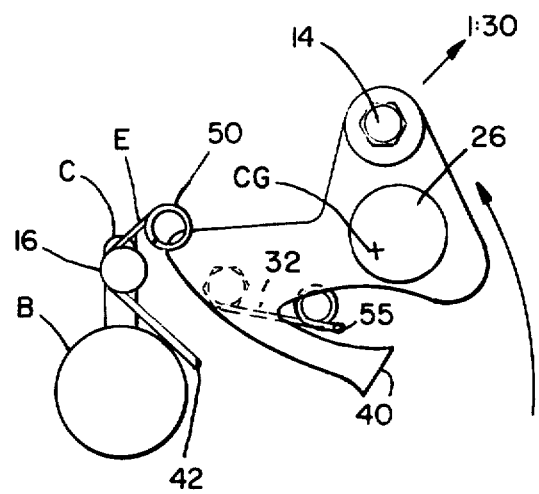
FIG_3f
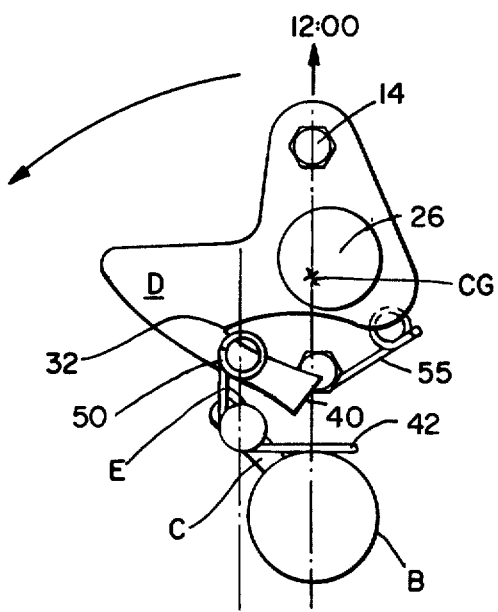
FIG_3g
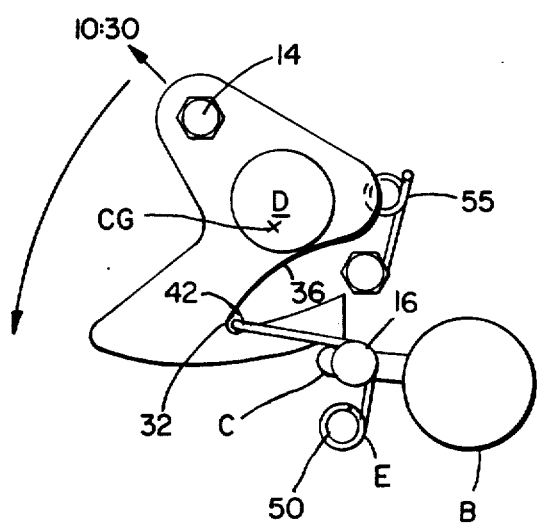
FIG_3h

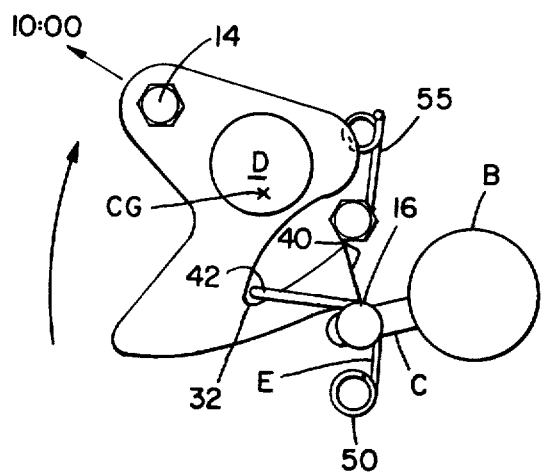
FIG_4a
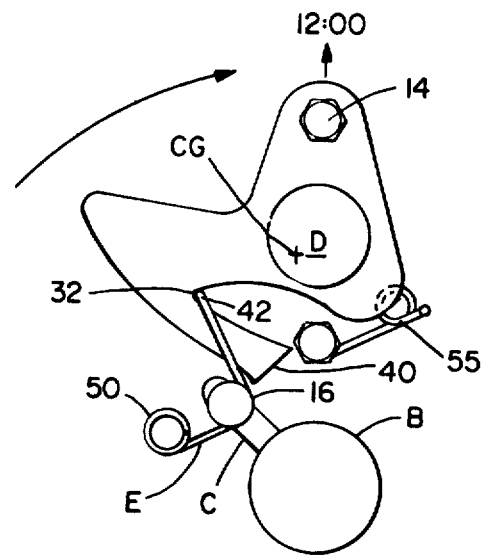
FIG_4b
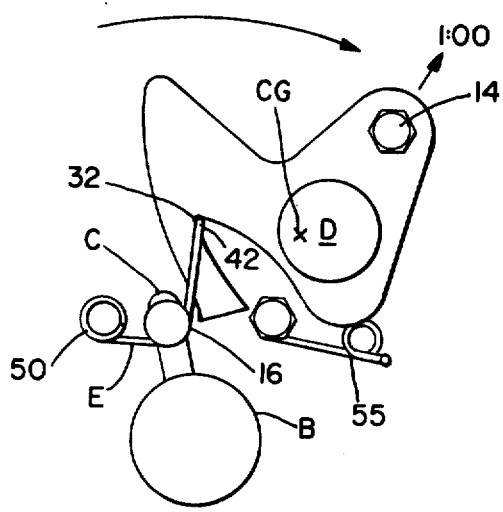
FIG_4c
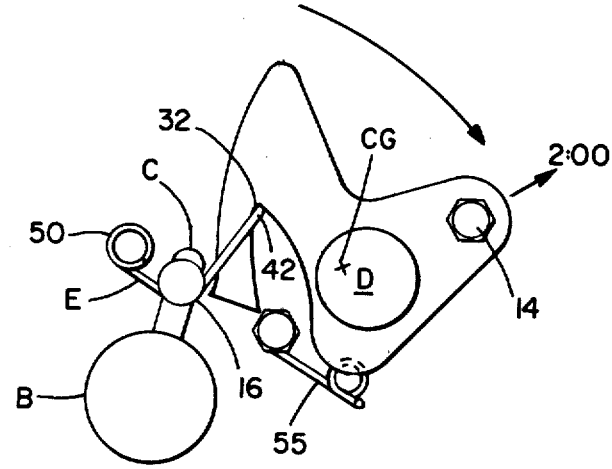
FIG_4d

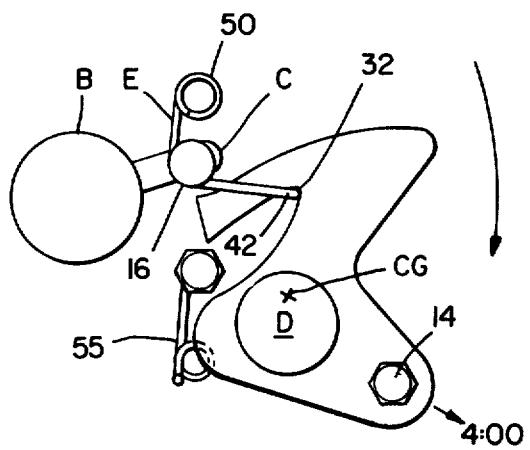
FIG_4e
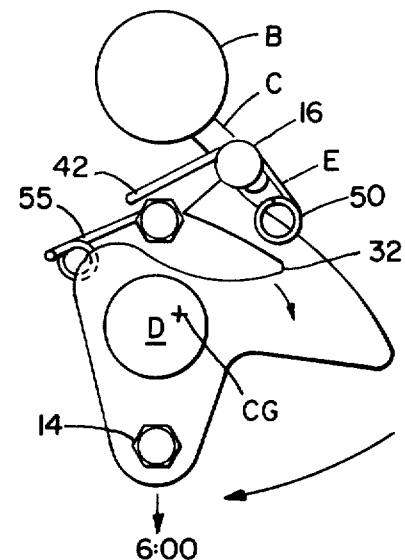
FIG_4f
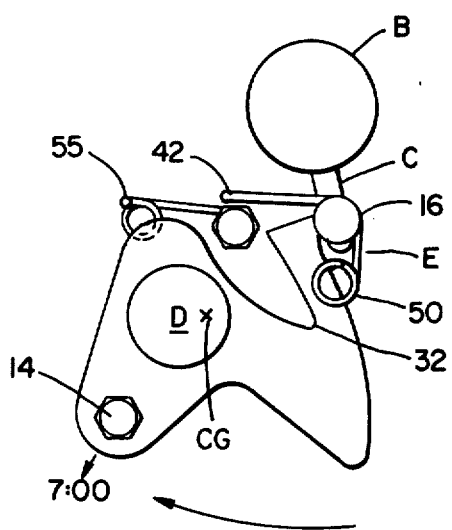
FIG_4g
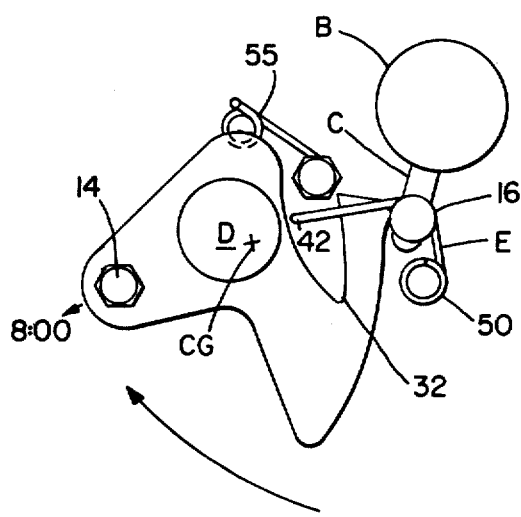
FIG_4h

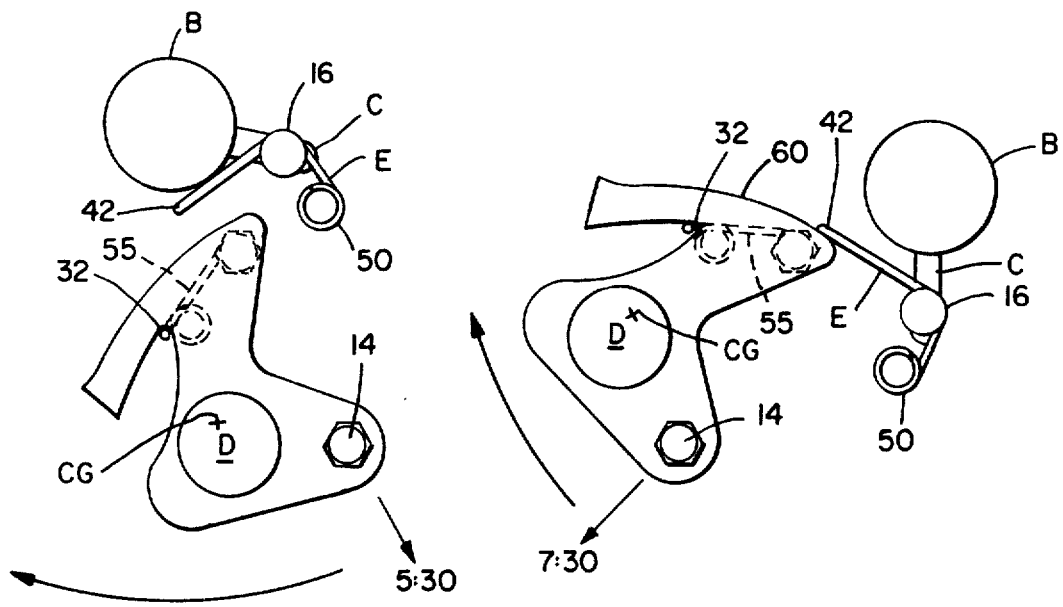
FIG _ 5a
FIG _ 5b
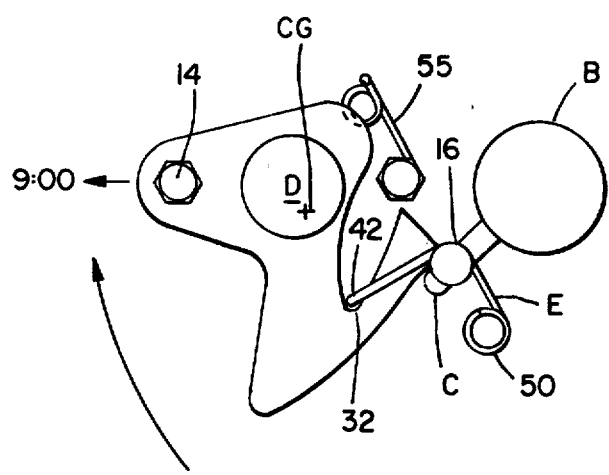
FIG _ 5c

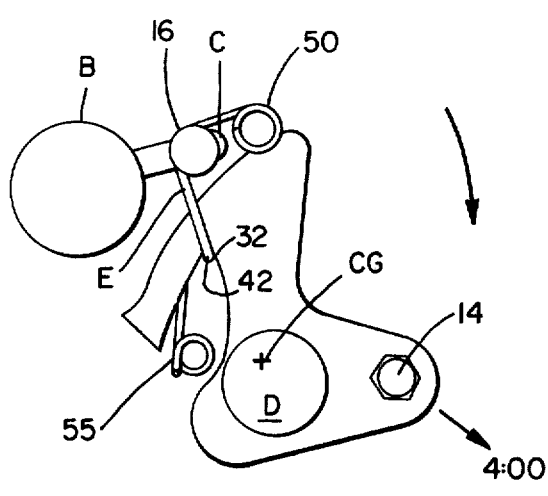
FIG_6
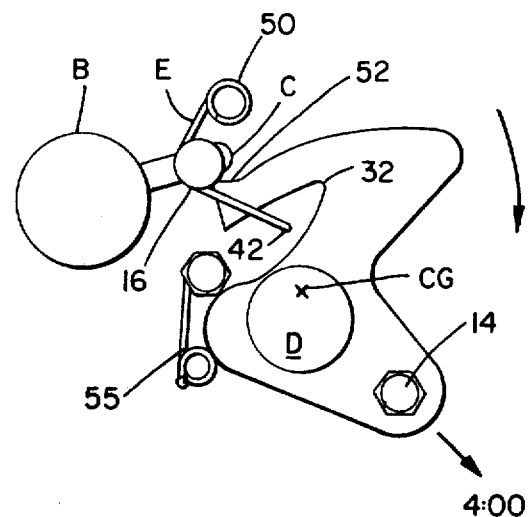
FIG_7
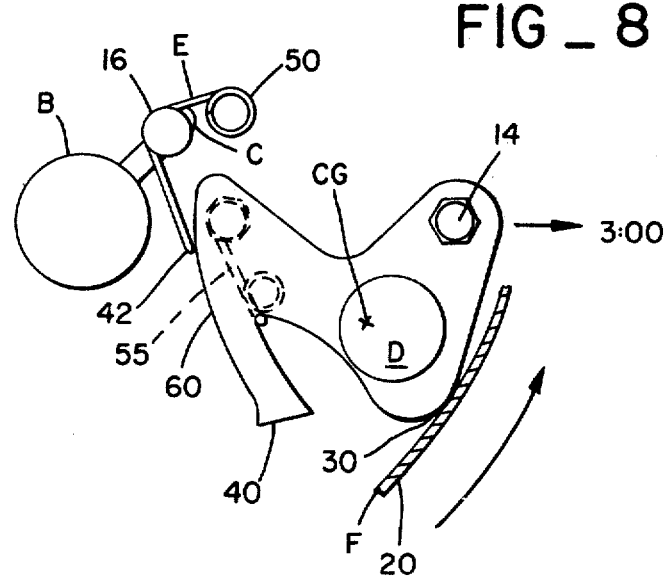
FIG_8

BACK-UP ALARM WITH IMPROVED KEEPER

BACKGROUND OF THE INVENTION

This invention relates to mechanical wheel alarms for mounting to the hub of rolling equipment such as dump trucks, such alarms including one or more ringing units each specially constructed to ring only in a single rotary direction. More particularly, this invention relates to an improved ringing unit for a wheel hub mounted back up alarm having an improved clapper and an improved interacting keeper to sound a prompt audible alarm when the wheel rotates in one direction (normally the reverse direction), to prevent sounding of the alarm when the wheel rotates in the opposite direction (normally the forward direction), to regard alarm freezing, sticking, and other malfunction, and to provide minimum wear on non-sounding rotation.

SUMMARY OF THE PRIOR ART

Vehicle wheel alarms having hub mounted bells with eccentrically mounted clappers are known. Such devices have their clappers in an over center eccentric pivot arrangement. The principal utility of these alarms is to sound an alarm when the vehicle is driven in reverse, i.e., "backs up". Upon back-up rotation of the hub, the alarm ringing occurs; upon forward rotation of the hub the alarm ringing does not occur. Some such devices are designed for or can be mounted so as to ring in both the forward and reverse directions, or to be selectable between ringing in both directions or only in a single direction. Since the mechanisms are approximately the same, regardless of the actual direction in which they ring, all such alarms can be referred to as "back-up" or "reverse" alarms since this is the principal purpose for such devices. Likewise, and for the same reasons, the non-ringing direction is often referred to as the "forward" direction, and the ringing direction is often referred to as the "reverse" direction. These terms are sometimes used in the same broad fashion herein.

Heretofore, various types of keeper mechanisms have been used to prevent undesired forward ringing. These prior art keepers have had at least three difficulties.

First, many of them are frequently ineffective to consistently prevent forward ringing. When the reverse bell sounds while the vehicle to which the alarm is mounted moves in the forward direction, the alarm loses its effectiveness and causes confusion. It will be understood that the keepers must withstand the high centrifugal forces developed on the clappers during forward motion of the vehicle at highway speeds.

Secondly, such keepers have blocked forward rotational ringing by moving into the path of the falling clapper and interrupting the clapper path to the bell. The clapper falls with its force on the keeper instead of falling with its force on the bell, often resulting in eventual keeper destruction. Repetitive impacts on the keeper by the bell clapper stress cycle the material of the keeper to the point where various material failures, typically of the fatigue variety, frequently occur.

Third, keepers heretofore have commonly become fouled, typically due to ambient mud and ice, whereupon either forward ringing or no ringing at all results. The alarms are typically mounted to construction equipment in sites where mud and ice are frequently encountered, so that the alarm, because of its keeper sticking, becomes a high maintenance item.

Examples of alarms in the prior art include, Brookwalter U.S. Pat. No. 2,807,229 and Geraghty U.S. Pat. No. 2,843,075, both of which are commonly assigned to the assignee of the present invention. Other examples of prior art alarms are shown in the references cited in such patents.

SUMMARY OF THE INVENTION

A mechanical wheel hub mountable vehicle alarm is disclosed having one or more ringing units mounted interiorly of a bell, each for sounding an audible alarm when the wheel rotates in one direction, but not in the opposite direction. Each ringing unit has an improved clapper and an improved interacting keeper to facilitate prevention of forward wheel motion ringing, to retard alarm freezing and sticking, and to provide minimum wear during non-ringing rotation. A Z-shaped clapper is used having two bars (i.e., bar-like segments) with an interconnecting diagonal (i.e., diagonal segment). The clapper is pivoted at the remote end of a first bar of the Z from a pivot point eccentrically mounted to the wheel hub. The clapper is provided with a weighted mass near the opposite extremity of the first bar where that bar joins the diagonal of the Z. The ringing surface of the clapper, defined adjacent the weighted mass, is at the outside edge of the first bar and diagonal. A keeper notch is defined between the second Z bar and the Z diagonal at the inside jog of the Z. The extremity of the second bar of the Z forms a keeper exercise surface to prevent keeper sticking. The keeper comprises a wire wound into a coil to provide a pivot about a post. The keeper wire projects from both ends of this coil to form an L-shaped crank. At the extremity of one of the bars of the L-shaped crank there is provided an over center mass. The extremity of the other bar of the L-shaped crank is bent in the direction of the clapper to provide a keeper element. The pivot of the keeper is rotationally advanced with respect to the pivot of the clapper during ringing rotation. During such ringing rotation, the keeper crank pivots on the post about the axis of the coil moving its keeper element free of the keeper notch responsive to the gravitationally over center mass of the keeper. The keeper element clears an arcuate configuration in the Z diagonal when it undergoes this notch-freeing motion. When the clapper becomes gravitationally over center, ringing motion of the clapper occurs. Upon non-ringing rotation of the alarm, the keeper enters the keeper notch whenever the clapper gravitationally rotates away from the bell to its cocked position. When the clapper becomes over center, it bears against the keeper at the keeper notch. As both the keeper and the clapper at the keeper notch have intersecting arcs of rotation about their respective pivots, the keeper blocks substantial clapper movement. At the same time the clapper with its heavy mass bears against the keeper so as to prevent keeper rotation away from its clapper blocking disposition under the force of the keeper over center mass. When the clapper is urged from its over center position towards its cocked position under the force of gravity, the keeper is immediately released and pivots free of the keeper notch. The over center decision points of both the clapper and the keeper crank are rotationally spaced so that after less than 90° of a turn of the hub the keeper again enters the keeper notch to prevent forward ringing. The keeper is given an improved pivot by providing for the wire coil to pivot about an acetal post to provide for maximum sticking resistance against ambient mud or ice sticking. Moreover, the clapper being provided with an exercise surface at its Z bar extremity remote from its pivot, provides for keeper exercise upon clapper movement to further prevent sticking of the clapper-keeper crank arrangement.

OBJECTS AND ADVANTAGES OF THE INVENTION

One object of this invention is to reduce movement of the clapper during non-ringing rotation of the alarm. According to this aspect of the invention, the keeper when engaged to the clapper at the keeper notch holds the clapper adjacent a rigid post and reduces movement of the clapper toward minimum. Thus, when rotation of the alarm occurs in the non-ringing direction, there is virtually no clapper impact against either the keeper or the post.

An advantage of this aspect of the invention is that since there is virtually no clapper impact against either the keeper or the post, there is no need to provide rubber stops for damping noise resulting from movement of the clapper upon non-ringing rotation. As such stops must frequenly be replaced due to age and repetitive impact, maintenance is reduced.

A further advantage of this aspect of the invention is that the keeper construction can accommodate clappers of much larger mass. Thus, the alarm of this invention can be rung with a greater force by a clapper of greater mass because of the keeper mechanism herein disclosed.

A further object of this invention is to prevent sticking due to mud and ice. According to this aspect of the invention, sticking is retarded due to improved construction of the keeper. Broadly, the keeper is constructed of wire wound in a helix about an acetal post. This keeper on the acetal post is caused to pivot during all modes of rotation in the ringing or non-ringing direction. It has been found that the helix of wire about the acetal post and pivoted during all modes of rotation is far less subject to sticking than keepers heretofore known.

Also, according to this aspect of this invention, sticking is also retarded by "exercising" the keeper during rotation in the ringing direction. This is done by equipping the clapper with keeper exercise surfaces so that if the keeper becomes stuck in certain positions, the exercise surface of the clapper will strike the keeper as the clapper moves to and from the bell, causing the keeper to move and helping to free it for normal operation.

In addition, according to this aspect of this invention, sticking is further prevented by spacing the keeper pivot from the back mounting plate, and the keeper pivot is located near the center post of the alarm. With this configuration, the penetration of ambient mud and ice into the alarm has been found to be far less frequent than in prior devices.

Yet another object of this invention is to provide for improved ringing upon ringing rotation. According to this aspect of the invention, ringing does not occur until the clapper pivot is slightly beyond bottom dead center. When the clapper is slightly beyon bottom dead center, ringing occurs as an interaction of two separate forces. First, gravity causes the clapper to fall towards the bell. Secondly, the pivot of the clapper moves slightly upwardly and away from the direction of clapper fall during ringing rotation. This movement supplies to the clapper a centrifugal force as well as gravitational force.

With the centrifugal force added to the gravitational force of the clapper, improved ringing occurs.

These and other objects, features and advantages of this invention will become more apparent after referring to the following specification and attached drawings in which:

FIG. 1 is a view of the alarm of this invention mounted to the hub of a vehicle with a section of the bell shown mounted about the alarm, and with four improved ringing units of this invention mounted to a backing plate;

FIG. 2 is a side elevation of the alarm ringing units shown in FIG. 1 with the concentrically mounted and overlying bell being only partially shown;

FIGS. 3a through 3h are sequential views of a single clapper and keeper according to this invention being rotated about a wheel hub during "back up" ringing rotation;

FIGS. 4a through 4h are sequential views similar to the series of FIGS. 3a through 3h with "forward" rotation occurring in the non-ringing direction;

FIGS. 5a through 5c are sequential views showing cocking of the clapper during a change from ringing to non-ringing rotation;

FIG. 6 is a view similar to FIG. 4e but showing an alternate position that the clapper and keeper may assume at low forward vehicle speeds;

FIG. 7 is a further view similar to FIG. 4e but showing the positions that the clapper and keeper will assume at high forward vehicle speeds; and FIG. 8 is a view similar to FIG. 3e but showing the positions that the clapper and keeper will assume at high reverse (ringing) vehicle speeds.

Referring to FIG. 1, a wheel hub mounted plate A is provided with a central hub B and four protruding keeper mounts C. At the four corners of plate A, four clappers D are each mounted at pivots 14. Four keepers E are each mounted on keeper mounts C for pivotal movement about posts 16.

The whole alarm mechanism is mounted interiorly of a bell F. The bell F surrounds the clapper mechanism and is impacted by the four clapper mechanisms from the inside. Such impact is illustrated at 20 in FIG. 1 where a clapper D is shown after it has fallen into the ringing position.

To facilitate understanding of the invention, the construction of the clapper D will first be set forth. Secondly, the construction of the keeper E will be discussed. Finally, and with reference to the sequential views of FIGS. 3a–3h, 4a–4h and 5a–5c, the operation of the alarm will be set forth.

Referring to the upper left-hand clapper D in FIG. 1, the clapper D will be seen to have a Z-shaped configuration. Referring to the first axis 22, the clapper may be described as having a first bar 24. The clapper is pivoted at the remote end of the first bar at pivot 14. The weighted mass 26 of the clapper D is located near the opposite extremity of the first bar 24 where first bar 24 joins the diagonal 28 of the Z-shaped clapper. The ringing surface 30 of the clapper, defined adjacent the weighted mass, is at the outside edge of the juncture of the first bar 24 and the diagonal 28.

A keeper notch 32 is defined between the second Z bar 34 and diagonal 28 at the inside surface of the jog of the Z. This is the surface which, when engaged with the keeper E, prevents forward ringing of the clapper D.

Referring to the clapper diagonal 28, it will be noted that the inside surface at 36 is provided with a curvature. This curvature 36 permits the keeper to pivot free of the clapper or to pivot into the clapper D during ringing and non-ringing rotation, respectively.

The extremity of second bar 34 is provided with an angled keeper exercise surface 40. This keeper exercise surface 40 functions to strike unweighted leg 37 (see FIG. 2) of the keeper E when it becomes stuck or fouled in certain positions, such as the position it would normally assume at the attitude illustrated by FIG. 4f or 4g and functions to assure that the keeper is free to gravitationally move during substantially all rotations of the clapper-keeper assembly. It should be noted that the two bars 24, 34, of the Z are not parallel. The axes 22, 35 of these bars intersect one another at an angle of about 45°. It will also be noted that the keeper exercise surface 40 is angled so that when it strikes the bent end 57 of the keeper wire 42, the wire 42 is thrust toward the alarm center post B. Thus, the plane of the exercise surface 40 intersects the arc of exercise surface travel at an obtuse angle, causing it to function as a wedge or inclined plane to drive the keeper end 57 toward the center post B.

Referring to FIG. 2, it should be noted that weight 26 forms a cylindrical protuberance on both sides of the clapper. Thus, this protuberance in the embodiment here shown forms the only surface which is substantially wider than the remaining portion of the clapper.

Likewise, keeper E may be easily understood with reference to the uppermost keeper E illustrated at FIGS. 1 and 2.

As can be seen in FIG. 1, the keeper E comprises in plan an L-shaped crank having a first unweighted leg or bar 42 and a second weighted leg or bar 44. Legs 42 and legs 44 are joined at the pivot 16 by a coil or helix 46 wound about a post 48. The post 48 is preferably of a formable, wear-resistant polymeric material having a low coefficient of surface friction, such as acetal sold by E. I. DuPont DeNemours & Co. under the trademark "Delrin". As can be seen, leg 42 projects from the bottom and leg 44 projects from the top of helix 46. The extremity of leg 44 is formed into a coil to provide added weight which is the over-center mass 50 that actuates the keeper crank E during during rotation of the alarm.

The keeper function of the keeper crank E is performed by the unweighted leg 42 which includes a bent end portion 57 to provide the keeper element. The end portion 57 engages the inside of keeper notch 32 on clapper D. Moreover, and because of its wire construction, keeper crank E and particularly end 57 thereof, tends to damp out vibration that may result from clapper movement.

It should be understood that, as shown in FIG. 3a–3c, for example, clapper D bears against keeper mount C at surface 52. Thus, the keeper mount performs two functions. First, it serves to mount the keeper crank E and second, it provides a surface against which the clapper D rests in cocked position.

It will be observed that pivot 16 of keeper crank E is spaced from the periphery of the bell, being located near the center of plate A. Moreover, as shown in FIG. 2, pivot 16 is mounted on a flange C which supports the pivot 14 in spaced relation to the plate A. It has been found that this configuration minimizes exposure of the keeper to mud, snow and the like and, thereby, assists in preventing the keeper from becoming fouled.

Before proceeding further, it should be observed that when the clapper D falls to the ringing position, it is engaged at the keeper notch 32 by a ringing restrainer spring 55. Ringing restrainer spring 55 functions to allow clapper D to strike the bell F at 20 and then pulls the clapper away from the inside surface of the bell F to prevent the clapper from damping the ring of the bell. Restrainer springs of various design are known and are conventional in these types of alarms.

Having set forth the construction of the bell, we can now proceed to consider the sequential views of FIGS. 3a–3h, 4a–4h and 5a–5c.

FIGS. 3a–3h illustrate the counter-clockwise (ringing) rotation of a single ringing unit, comprised of keeper E pivoted at 16 on keeper mounting flange C and clapper D eccentrically pivoted at 14 on back plate A (not shown) about the center post B of the alarm. FIG. 3a shows the pivot 14 of clapper D positioned at 9 o'clock in the rotation of the ringing unit about the axis of central hub B. Keeper E lies within the keeper notch 32 and clapper D rests on flange C.

Referring to FIG. 3b, the ringing unit has rotated so that the clapper pivot 14 is located at 7:30 o'clock about the axis of central hub B. Keeper E, under the force of its over center mass 50, has begun to swing free of the keeper notch 32. This swinging movement clears clapper surface 36 owing to its arcuated shape. Thus, in FIG. 3b the clapper D is shown in a cocked position.

In FIG. 3c, the pivot 14 of clapper is disposed at 6:00 o'clock about the axis of central hub B. Keeper E under force of its over center mass 50 has pivoted completely free of the keeper notch 32. Clapper D remains cocked. Weight 26 is directly above pivot 14 and will overbalance the clapper D, causing it to fall, upon further counterclockwise rotation of the ringing unit about the axis of hub B.

In FIG. 3d, the pivot 14 has moved counterclockwise to 4:30 o'clock and weight 26 of clapper D has overbalanced the clapper, causing it to fall and strike bell 20 with surface 30. Spring 55 is slightly distended and will immediately retract clapper D to disengage striking surface 30 from the bell 20, so that the bell will sound without dampening by the clapper. It will be noted that keeper E has swung entirely out of the way of the clapper and has not prevented it from striking the bell 20.

In FIG. 3e, pivot 14 of clapper D has moved counterclockwise to 3:00 o'clock. It will be seen that the unweighted leg 42 of keeper E rests against hub B.

In FIG. 3f, pivot 14 of clapper D has moved to 1:30 o'clock and the keeper notch 32 of clapper D has moved, under the force of gravity, away from spring 55. Cocking of the clapper D is beginning to occur. Note that the center of gravity of the clapper D lies slightly to the left of and lower than the center of weight 26 as indicated by the point labeled CG in FIG. 3f.

In FIG. 3g, pivot 14 of clapper D is at 12:00 o'clock with respect to hub B. The clapper D is almost completely cocked. At the same time, keeper E is poised to swing under urging of its over center mass 50, into clapper keeper notch 32.

In FIG. 3h, clapper D is shown with its pivot 14 disposed at 10:30 o'clock with respect to central hub B. Mass 50 of keeper E has overbalanced the keeper, swinging the bent unweighted keeper leg 42 into engagement with the keeper notch 32 clearing the clapper at the arcuate contour 36.

At this juncture, an important function of this alarm should be noted. Almost at the same instant that the clapper moves to the cocked position, the keeper E pivots into the keeper notch. This more or less simultaneous movement of the clapper D to its cocked position and the keeper E to its keeping position helps prevent so-called "forward ringing" in the following manner:

Assume that the wheel to which the alarm is mounted has been rolling backward (turning counterclockwise as shown in FIGS. 3a–3h) and came to rest with the pivot 14 of one clapper at about the 10:30 – 11:30 position. If the wheel then begins to roll forward (clockwise) from that position or beyond, the keeper is positioned to prevent the clapper from ringing the bell. If the backward (counterclockwise) moving alarm had come to rest with one clapper between about 3:00 o'clock and about 12:00 o'clock (as shown in FIGS. 3e–3g), the clapper would move toward the bell, free from interference by the keeper E, but would not have sufficient energy to overcome restraining spring 55 to strike the bell. On the next revolution, the keeper would fall into place in the notch 32 and thereafter hold the clapper away from the bell without relying on the restraining spring 55.

FIGS. 4a–4h show the ringing unit of FIGS. 3a–3h rotating in the clockwise or forward direction. FIG. 4a shows pivot 14 of clapper D at the 10:00 o'clock position with respect to the central hub B. The keeper E is shown engaging the clapper at the keeper notch 32.

In FIG. 4b, the clockwise rotation of the ringing unit has continued until clapper pivot 14 is disposed at the 12:00 o'clock angle with respect to hub B. Keeper E engages the keeper notch at 32 and allows only a slight movement of clapper D away from its cocked position.

In FIG. 4c the ringing unit has moved so that pivot 14 is at the 1:00 o'clock position with respect to central hub B. Keeper E remains lodged in keeper notch 32.

An important function of the clapper-keeper combination should be noted. Although clapper D is much more massive than keeper E, when clapper D bears against keeper E at keeper notch 32, rotation of the keeper against the force of its over center mass 50 is not possible. Thus, the mass of the clapper against the keeper restrains movement of the clapper and, at the same time, holds the keeper in its clapper locking disposition. In this position the center of gravity of the clapper D is restrained to a position counterclockwise of a line drawn between the center of the hub B and the center of the clapper pivot 14. As a result, the position of the clapper D, established by the keeper E, is firm. Should the entire wheel hub assembly vibrate upwardly or downwardly, as in the case of a wheel passing over a rock, firm retention of the clapper D from the ringing position still occurs.

As shown in the sequential views of FIGS. 4d and 4e, retention of the clapper from its ringing position continues as the clapper rotates from 1:00 o'clock to 4:00 o'clock.

In FIG. 4f, clapper D has rotated to the 6:00 o'clock position, at which point, two separate phenomena have occurred.

First, the center of gravity of clapper D which has been restrained to a position counterclockwise of a line between the center of hub B and the center of pivot point 14, overbalances the clapper causing it to rotate a short distance in its own clockwise direction about pivot 14 into contact with keeper mounting flange C. In this over-center position, the clapper D has unweighted from the keeper E.

Secondly, immediately after the clapper D has unweighted from the keeper, keeper E, under the force of its over-center mass 50, (which was already urging the keeper to swing clockwise about its pivot 16) have pivoted free of the keeper notch 32 and clapper D. Thus, should wheel reversal occur from the rotational position of FIG. 4f, ringing of the clapper would immediately occur. It thus is an important advantage of the present invention that as soon as the clapper becomes cocked against the keeper flange, as the alarm rotates in the non-ringing direction, reverse rotation will cause immediate ringing. As a result, when the alarm functions properly, the vehicle need but traverse a very short distance in the ringing direction before ringing occurs. This distance would be no more than about 90°. On the average, ringing would occur with 45° rotation (about ⅛ turn).

Referring to FIG. 4g, pivot 14 of clapper D has moved so that it is at 7:00 o'clock with respect to central hub B. Keeper E continues its pivot free of the keeper notch 32. Clapper D rests against the keeper mount C.

Referring to FIG. 4h, pivot 14 of clapper D has moved to 8:00 o'clock with respect to the hub B. The keeper at E under force of its over center mass 50 is again beginning to enter the keeper notch 32. Thus, the clapper D was only free of direct restraint by the keeper E for a rotational angle of less than approximately 60°.

Referring to the sequential views of FIGS. 5a–5c, a special case of the clapper mechanism herein shown occurs. Typically, clapper D will have just rung when its pivot 14 moves to the 5:30 o'clock position with respect to the central hub B. Keeper E on its mount C at its own pivot 16 will have moved to a disposition where it is clear of the clapper D. Suppose reversal of rotation occurs at this juncture and that as shown in FIG. 5b, the ringing unit rotates from the disposition shown in FIG. 5a clockwise so that its pivot 14 is disposed at 7:30 o'clock with respect to mount B. At this point, it will be noted that the keeper E having rotated about its pivot 16 on mount C bears against the outer arcuate surface 60 of the clapper D, in response to urging of the over center mass 50 of the keeper E under the force of gravity.

When the ringing unit rotates further so that the clapper pivot 14 is at 9:00 o'clock with respect to the central hub B, as shown in FIG. 5c, two things occur. First, the clapper D under the force of its over center mass falls to the cocked position. Secondly, the keeper E rotating about its pivot 16 on the keeper mount C immediately moves into the keeper notch 32 so that the clapper D is restrained to the non-ringing disposition and will not ring.

An advantage of the present alarm is its resistance to ringing in rough, bumpy terrain. For example, when the alarm is rotating in the non-ringing direction, with clapper pivot 14 between about 1:00 o'clock and about 4:00 o'clock (see FIGS. 4c–4e), the clapper D rests on the keeper E, each of which would swing to a different position but for the other. At this point, the keeper leg 42 is being subjected to compression forces by the clapper D. If the clapper is unweighted upwardly from the keeper E, as occurs when the vehicle hits a bump, it is prevented by the keeper mount C from rotating through the relatively great arc required before the keeper can swing free in the counterclockwise direction. The keeper may swing clockwise with a less arcwise clapper movement, but if it does so, there are two factors mitigating against the clapper swinging free. First, for the keeper to swing clockwise, it must overcome the weight of its counterbalance 50. Second, when the clapper falls back under gravity (counterclockwise) after the initial bump thrust has been expended, it is likely to either catch the keeper in its same position (returning it to the compression mode) or in some keeper position less than about 90° clockwise, in which case the keeper leg 42 will again lodge in the clapper notch 32, but their respective positions will be rearranged so that the keeper wire is now under tension, rather than compression. (See FIG. 6 which corresponds to FIG. 4e but shows the keeper in tension rather than compression.)

It will be appreciated that the ringing and non-ringing function of the alarm is operable only within rotational speeds in the range from 0 to ∓ X r.p.m., where X is a function of wheel size and alarm geometry. At speeds in excess of ∓ X r.p.m., centrifugal forces overcome the influence of gravity and the clappers D lock into fixed positions. This is sometimes referred to as "locking up" or "locking out", and it is a common feature of other prior art mechanical wheel alarms.

It is in this "lock out" mode of operation that the interaction of the intersecting arcs of the rotations of keeper E and clapper D with respect to the location of the center of gravity (CG) of the clapper D is of particular importance. In prior art alarms, the arrangement of the clappers and the ring preventing latches or keepers was such that the clappers would "lock out" against the keepers and such keepers would then be sujected to the high centrifugal forces acting on the clappers at high vehicle speeds on the highway.

However, according to the teaching of this invention, the intersecting arcs of rotation of the clapper D and keeper E are such that the center of gravity (CG) of the clapper D is maintained in a position counterclockwise of the line defined by the center of the hub B and the center of the clapper pivot 14. Thus, as shown in FIG. 7, the centrifugal force acting on the clapper D tends to cause it to rotate in a clockwise direction about pivot 14 causing the surface 52 of the clapper D to continuously bear against the keeper mount C as when the clapper is in cocked position shown in FIG. 4a. Furthermore, at highway speeds, this position of the clapper D will be independent of the angular position of the ringing unit, of which it is a part, about the axis of the hub B. This is best illustrated by comparing FIG. 7 with FIG. 4e, both of which show the clapper pivot 14 at 4:00 o'clock with respect to the axis of the hub B with FIG. 7 showing the positions of the clapper D at high forward vehicle speeds and FIG. 4e showing the position of the clapper D at low forward vehicle speeds.

Similarly, FIG. 8 shows the position in contact with the bell F that the clapper D will assume and maintain at high reverse vehicle speeds independent of the angular position with respect to the axis of the hub B of the ringing unit of which it is a part. It will be understood that it is desirable to have the clapper D "lock out" against the bell F since this will automatically insure that the bell will ring until the vehicle has reached the "lock out" speed in the reverse (or ringing) direction.

Thus, a comparison of FIG. 8 with FIG. 3e, both of which show the position of the clapper D when the clapper pivot 14 is at 3:00 o'clock with respect to the axis of the hub B, will illustrate the difference in position of the clapper D at high reverse vehicle speeds (FIG. 8) and low (ringing) reverse vehicle speeds (FIG. 3e). It should be noted in FIG. 8 that the clapper D overcomes the force of the spring 55 to bear against the bell F and that the keeper E bears against the exercise surface 60 of the clapper D and is thus in position to be moved by the clapper D as soon as the "lock out" mode ceases, thereby preventing any tendency of the keeper E to freeze in an inoperative position.

A similar protection is provided against freezing of the keeper E in an inoperative position where "lock out" occurs, as shown in FIG. 7, at high forward vehicle speeds. Thus, when the vehicle slows to a forward speed less than that required to produce "lock out", the clapper D will assume either the position shown in FIG. 6 or that shown in FIG. 4e and in either event, the keeper E will be moved by the clapper D to overcome any likelihood of the keeper E being frozen in an inoperative position after an extended period of forward travel by the vehicle at speeds higher than the "lock out" speed.

Having fully set forth the operation of the alarm ringer of this invention, several observations can be made. First, although four alarm mechanisms concentrically mounted at 90° intervals about the single hub B are preferred, naturally more or less than four alarm mechanisms can be used. In this regard, the controlling considerations are the wheel diameter of the vehicle and the distance which the vehicle is permitted to travel without sounding the alarm, since the latter depends upon the former as well as upon the arc separation of the ringing units. In some instances, governmental safety regulations prescribe the maximum distance certain vehicles may travel without sounding some alarm. It will also be apparent that equal arc spacing of the ringing units is not essential, although it is preferred in view of these same considerations.

Further, it will be appreciated that the ringing units may be altered to ring in the opposite direction from that illustrated simply by employing a mirror image of the configuration shown. All parts of the preferred embodiment except the keeper wire have front-to-back symmetry and can be simply reversed for this purpose. If it is desired that the alarm ring in both the forward and reverse directions, the ringing units can be arranged so that alternate units ring in opposite directions, although this will reduce the frequency of ringing by one-half. Moreover, alteration can be made to the shape of the clapper mechanism although the relationship between the center of gravity of the clapper and its pivotal must be maintained. This is especially true as to those portions of the clapper mechanism which are away from the notch 32 and on the opposite side of the diagonal 28.

These and other modifications can be made to specific structure herein disclosed without departing from the spirit of the invention, as will be readily appreciated by those of ordinary skill in the art.

I claim:

1. In a vehicle alarm for providing an audible alarm signal upon vehicle wheel rotation in a predetermined or so-called "ringing" direction, the alarm characterized in that it includes means for mounting the alarm at the hub of the vehicle wheel for mutual rotation therewith about common rotational axes; a bell having an interior surface; at least one clapper eccentrically mounted for reciprocal swinging movement of its striking surface along a path extending between a bell striking position and a cocked position, the striking position characterized by engagement of the clapper striking surface against the bell interior surface, the cocked position characterized by location of the striking surface at its furthest point of travel along the path from the bell striking position; the alarm further preferably including means for resiliently retracting the clapper from engagement with the bell as soon as the clapper strikes the bell to mitigate dampening of the bell by the clapper; and, the alarm further including a keeper for holding the clapper away from its bell striking position during alarm rotation in the opposite or so-called "non-ringing" direction, the improvement wherein the keeper maintains the clapper substantially immobile at its cocked position throughout repeated full revolutions of the alarm in the "non-ringing" direction.

2. The vehicle alarm of claim 1 wherein the keeper is swingably mounted for gravity actuated movement between a clapper holding position and a clapper release position, said clapper holding position characterized by coacting interrelationship to the clapper and the keeper such that when the clappper is at its cocked position the keeper substantially maintains it there, said clapper release position characterized by lack of impediment by the keeper of clapper travel from the cocked position to the bell striking position.

3. The vehicle alarm of claim 2 wherein the keeper is comprised of bearing means for swingably mounting the keeper on a support within the bell interior, means for engaging the clapper when the keeper is in the clapper holding position, and means for counterbalancing the clapper engaging means to position the clapper engaging means in coacting interrelationship with the clapper.

4. The vehicle alarm of claim 1 wherein the alarm further includes means for limiting clapper movement at the cocked position in a direction away from the bell striking position, and wherein the clapper is provided with a bearing portion for swingable mounting of the clapper on a support within the bell interior, a body portion on which the clapper's bell striking surface is located, said body portion further having a surface for engaging the keeper when the clapper is at the cocked position and a surface for engaging said limiting means.

5. The vehicle alarm of claim 4 wherein said keeper engaging surface is a notch formed in said body portion of the clapper.

6. The vehicle alarm of claim 5 wherein the clapper striking surface is located on the same side of said notch as said bearing portion, and wherein the limiting means engaging surface is located on the opposite side of said notch from said bearing portion.

7. The vehicle alarm of claim 6 wherein the clapper is a generally Z-shaped member, having first and second bar-like segments joined by an interconnecting diagonal segment, said bearing portion located at the free end of the first bar-like segment, said clapper striking surface located at the junction of said first bar-like segment and said diagonal segment, said notch located at the junction of said second bar-like segment and said diagonal segment, and said limiting means engaging surface located at the free end of said second bar-like segment.

8. The vehicle alarm of claim 7 wherein the keeper is mounted on said limiting means.

9. The vehicle alarm of claim 5 wherein the clapper is provided with means for clearing the keeper out of the path of the clapper during travel from the cocked position to the bell striking position when the keeper is in a position intermediate its said clapper holding position and its said clapper release position.

10. The vehicle alarm of claim 9 wherein said keeper clearing means is an inclined surface formed on the clapper.

11. The vehicle alarm of claim 4 wherein said limiting means is located relatively near the rotational axis of the alarm whereas said bearing portion of the clapper is located relatively near the lip of the bell.

12. The vehicle alarm of claim 11 wherein the keeper is mounted on said limiting means.

13. The vehicle alarm of claim 5 wherein said notch further serves as the seat for engagement of the clapper with the preferred resilient clapper retracting means.

14. The vehicle alarm of claim 4 wherein the keeper is swingably mounted for gravity actuated movement between a clapper holding position and a clapper release position, said clapper holding position characterized by coacting interrelationship of the clapper and the keeper such that when the clapper is at its cocked position the keeper substantially maintains it there, said clapper release position characterized by the lack of impediment by the keeper of clapper travel from its cocked position to its bell striking position.

15. The vehicle alarm of claim 14 wherein the keeper is comprised of bearing means for swingably mounting the keeper on a support within the bell interior, means for engaging the clapper when the keeper is in the clapper holding position, and means for counterbalancing the clapper engaging means to position the clapper engaging means in coacting interrelationship with the clapper.

16. The vehicle alarm of claim 4 wherein the means for mounting the alarm includes a plate for vertical mounting at the wheel hub, said plate serving as a support for the clapper, wherein said limiting means is mounted on said plate, and wherein the keeper is mounted on said limitng means in spaced relation to said plate.

17. The vehicle alarm of claim 16 wherein said limiting means comprises a flange extending radially from the center of the alarm.

18. The vehicle alarm of claim 3 wherein the keeper is a shaped length of wire, one end of which serves as said clapper engaging means, the other end of which serves as said counterbalancing means, and the medial portion of which is helically wound and serves as said bearing means.

19. The vehicle alarm of claim 4 wherein the center of gravity of said clapper in the plane of said swinging movement of said clapper is rotationally advanced in said non-ringing direction of rotation of said alarm from the line defined by the center point of said eccentric mounting of said clapper and the center point of said hub of said vehicle wheel when said clapper is in said cocked position thereof.

20. The vehicle alarm of claim 1 wherein the means for mounting the alarm includes a plate for vertical mounting at the wheel hub, said plate serving as a support for the clapper, and wherein the keeper is mounted in spaced relation to said plate.

21. A device for providing an audible alarm upon rotation of a vehicle wheel in a first direction comprising means for mounting said device at the wheel hub;
a bell mounted on said mounting means;
a clapper mounted on said mounting means, said clapper mounted eccentrically with respect to the axis of wheel rotation for gravity actuated swinging movement between a cocked position and a bell striking position;
gravity actuated keeper means for permitting the clapper to swing from its cocked position to its bell striking position when the device is rotated in a first direction about a horizontal axis, and for holding the clapper in its cocked position when the device is rotated in the opposite direction about said axis even when rotation of the device in the first direction is reversed substantially immediately after said clapper has swung into its cocked position.

* * * * *